(12) United States Patent
Lawson

(10) Patent No.: US 6,361,032 B1
(45) Date of Patent: Mar. 26, 2002

(54) COMPOSITE LEAF SPRING WITH IMPROVED LATERAL STIFFNESS

(75) Inventor: Robert C. Lawson, Ann Arbor, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/643,344

(22) Filed: Aug. 22, 2000

Related U.S. Application Data

(60) Provisional application No. 60/215,422, filed on Jun. 30, 2000.

(51) Int. Cl.[7] ................................................. F16F 1/18
(52) U.S. Cl. ........................ 267/158; 267/7; 267/37.1; 267/47; 267/148
(58) Field of Search ............................... 269/158, 160, 269/7, 192, 193, 229, 230, 36.1, 37.1, 47, 246, 148, 149

(56) References Cited

U.S. PATENT DOCUMENTS

| | | | | |
|---|---|---|---|---|
| 4,278,726 A | * | 7/1981 | Wieme | 267/152 |
| 4,530,490 A | * | 7/1985 | Misumi et al. | 267/47 |
| 4,565,356 A | * | 1/1986 | Nickel | 267/148 |
| 4,621,834 A | * | 11/1986 | Aubry et al. | 267/52 |
| 4,753,835 A | * | 6/1988 | Misumi et al. | 267/52 |
| 4,772,044 A | * | 9/1988 | Booher | 267/149 |
| 5,035,406 A | * | 7/1991 | Sellers et al. | 267/48 |
| 5,244,189 A | * | 9/1993 | Pierman | 267/47 |
| 5,248,130 A | * | 9/1993 | Lisowsky | 267/47 |
| 6,012,709 A | * | 1/2000 | Meatto et al. | 267/36.1 |
| 6,056,276 A | * | 5/2000 | Muzio | 267/36.1 |
| 6,189,904 B1 | * | 2/2001 | Gentry et al. | 267/47 |

FOREIGN PATENT DOCUMENTS

| | | | | |
|---|---|---|---|---|
| JP | 357076368 | * | 5/1982 | 267/158 |
| JP | 357190140 | * | 11/1982 | 267/158 |
| JP | 35802103 | * | 2/1983 | 267/148 |
| JP | 358077941 | * | 5/1983 | 267/149 |
| JP | 361144437 | * | 7/1986 | 267/47 |
| JP | 363225738 | * | 9/1988 | 267/149 |

* cited by examiner

Primary Examiner—Robert J. Oberleitner
Assistant Examiner—Devon Kramer
(74) Attorney, Agent, or Firm—John E. Kajander

(57) ABSTRACT

A method of increasing lateral stiffness in fiberglass composite leaf springs used in suspension systems. The increase in lateral stiffness is accomplished by introducing two carbon fiber inserts to the longitudinal side regions of a fiberglass composite spring. The amount of volume of carbon fiber inserts is preferably between 10–20% by volume of the total volume of the spring and is a function of the strain characteristics required within the suspension system. The composite leaf spring secures the weight advantages of fiberglass springs as compared with traditional steel leaf springs and improves lateral stiffness that promotes improved handling as well as increased efficiency in the packaging of suspension and fuel storage systems. These new composite springs can be molded from layering preprag tape containing fiberglass, carbon fiber and resin, or from a 3D weaving process.

18 Claims, 2 Drawing Sheets

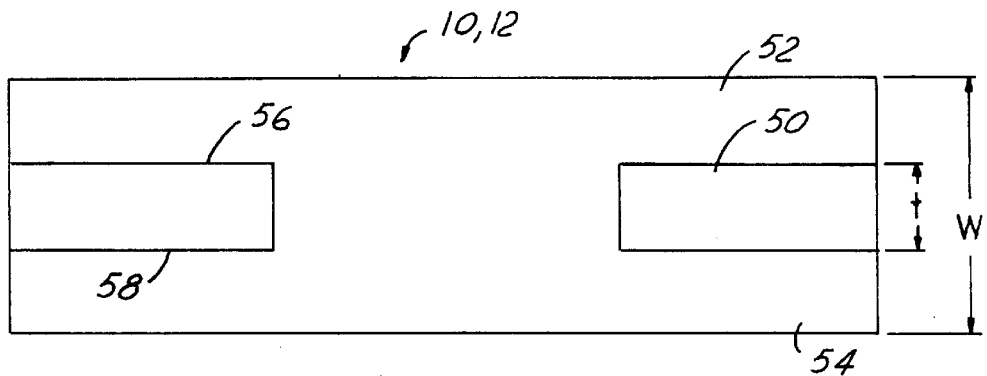
FIG. 2
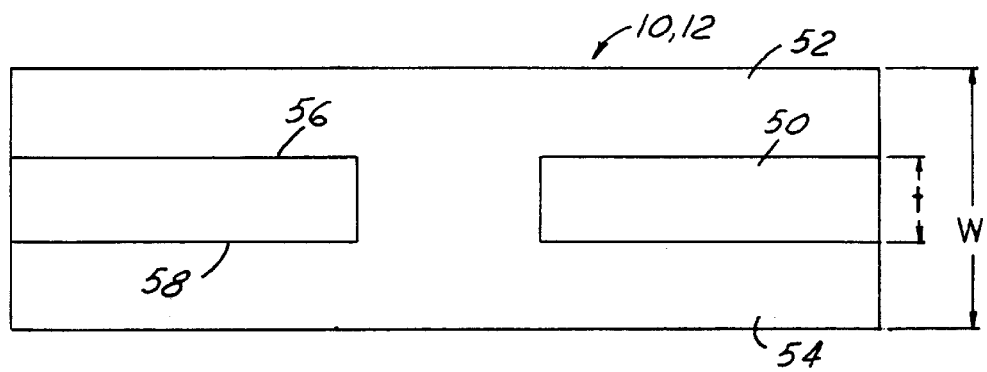
FIG. 3
HYBRID CARBON/GLASS LEAF SPRING
```
overall height                    20
overall width                     75
glass only lateral El       2.26E+10
fail strain glass              0.028
fail strain carbon             0.016
carbon height                     11
carbon width                      10
total lateral El            3.74E+10
total area                      1500
area carbon                      220
area glass                      1280
% increase in lat stiff          66%
```
FIG. 4

COMPOSITE LEAF SPRING WITH IMPROVED LATERAL STIFFNESS

CROSS REFERENCE TO RELATED APPLICATIONS

The present invention claims priority from U.S. Provisional Application Ser. No. 60/215,422, filed Jun. 30, 2000 and entitled "Method of Manufacturing Cross-Car Spring And Article Produced Thereby."

TECHNICAL FIELD

The present invention relates generally to suspension systems and more particularly to a composite leaf spring with improved lateral stiffness for use in suspension systems.

BACKGROUND

A suspension system on an automobile works with the tires, frame or unit body, wheels, wheel bearings, brake system, and steering system to provide a safe and comfortable means of transportation. A suspension system has several important functions, including supporting the various components of an automobile, allowing the tires to move up and down to provide a comfortable ride, allowing for rapid cornering without extreme body roll, keeping the tires on the road surface, preventing excessive body squat when accelerating, preventing excessive body dive when braking, allowing the front wheels to turn side-to-side for steering, and, in combination with the steering system, keeping the wheels in correct alignment.

The suspension system uses springs, swivel joints, damping devices, and other components to accomplish these functions. The springs that are used within suspension systems have two primary functions. First, the springs should jounce (compress) and rebound (extend) when the tires encounter objects and holes in the road surface. The springs should also support the weight of the car while still allowing suspension travel (movement).

Leaf springs are commonly made of flat plates or strips of spring steel bolted together. Recently, fiberglass has shown potential to replace steel in longitudinal leaf springs because it significantly reduces weight. However, one disadvantage with these fiberglass leaf springs is that they generally tend to have less lateral stiffness as compared with comparable steel leaf springs.

It is thus highly desirable to provide a new leaf spring having the lateral stiffness of a steel leaf spring and the reduced weight of a fiberglass leaf spring while maintaining the vertical compliance and strength of a spring consisting of only fiberglass materials.

SUMMARY OF THE INVENTION

It is an object of the present invention to improve the lateral stiffness of a fiberglass leaf spring for use in a suspension system of an automobile while maintaining vertical compliance.

The above object is accomplished by replacing a small amount of glass fiber along the outer side edge of the fiberglass leaf spring with a small amount of carbon fiber. The amount and location of the carbon fiber replacing glass fiber within the leaf spring is controlled to improve lateral stiffness without significantly changing the vertical compliance and strength characteristics of the composite leaf spring.

The present invention uses manufacturing techniques commonly used in the textile or composite industry to produce the new composite leaf spring, thus new manufacturing processes do not need to be developed.

Other objects and advantages of the present invention will become apparent upon considering the following detailed description and appended claims, and upon reference to the accompanying drawings.

BRIEF DESCRIPTION OF THE DRAWINGS

FIG. 2 is an end view of the composite leaf spring of FIG. 1 according to one preferred embodiment of the present invention in which the thickness "t" of the carbon fiber insert is shown;

FIG. 3 is an end view of FIG. 2 in which the thickness "t" has reached its maximum allowable thickness and in which the top surface and bottom surface are lengthened; and FIG. 4 is a table indicating the improved lateral stiffness of a preferred embodiment of the present invention.

DESCRIPTION OF THE PREFERRED EMBODIMENT(S)

Figure 1:
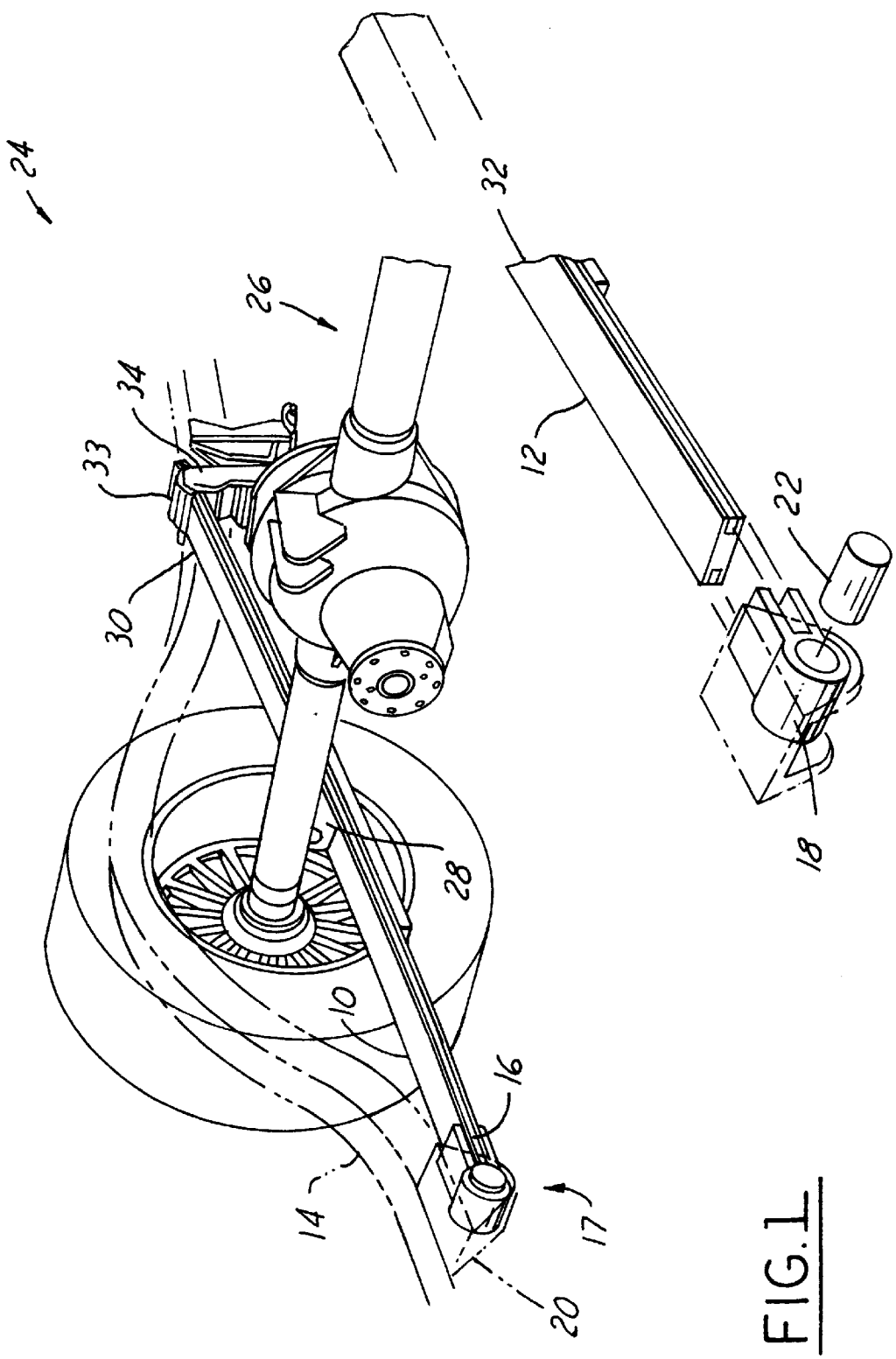
FIG. 1 shows a suspension system having a composite leaf spring according to one of the preferred embodiments of the present invention.

Referring now to FIG. 1, a pair of composite leaf springs 10, 12 are pivotally connected at their forward ends 16 to the vehicle frame 14 via a front mounting bracket 17. As shown in FIG. 1, this mounting bracket 17 may include extruded alloy hinge elements 18, steel frame trunnions such as 20 and pins such as 22. The springs 10, 12 have a composite structure that is described below and are made of a plurality of plates 13, or laminations, that are shaped to withstand a desired strain load. This composite construction reduces the weight of the springs 10, 12.

The illustrated adaptation in FIG. 1 is for the rear of a vehicle 24. As shown in FIG. 1, the leaf springs 10, 12 extend longitudinally in spaced apart, parallel relation, below the rear axle housing 26. However, the leaf springs 10, 12 could also be above the rear axle housing 26. The leaf springs 10, 12 are rigidly attached intermediate to their lengths to the axle housing 22 by clamp assemblies 28. The rear ends 30, 32 of the leaf springs 10, 12 are pivotally connected to a rear-mounting bracket 33 which includes steel shackles 34. The shackles 34 may be rigidly connected to the ends of a transverse sway bar (not shown). Further, a pair of shock absorbers (not shown) may be connected to the clamp assemblies 28 to the vehicle frame 14 to dampen up and down motions of the axle housing 26 relative to the frame 14.

As best seen in FIGS. 2–3, the leaf springs 10, 12 are comprised of a carbon fiber insert 50 positioned within each side of the longitudinal side edges 54 within a glass fiber composite 52. Preferably, the glass fiber composite 52 is E-type glass; however, S-type glass may also be used. When added to the longitudinal side edges 54 of the leaf spring 10,12, this carbon fiber insert 50 improves the spring's lateral stiffness compared to leaf springs composed entirely of glass fiber.

The amount of carbon fiber insert 50 is monitored within the leaf spring 10, 12. Preferably, the amount of carbon fiber insert 50 is between 10 and 20% by volume of carbon fiber composite and 80 to 90% by volume glass fiber composite 52. The amount of carbon fiber composite is distributed equally in each of the pairs of carbon fiber inserts 50. Carbon fiber insert 50 is added to the edge 54 until a certain thickness, represented by "t" in FIG. 2, is achieved. If more carbon fiber insert 50 is needed, the volume should be added towards the middle of the leaf spring while maintaining thickness "t". As shown in FIG. 3, this is done by increasing the length of the top surface 56 and bottom surface 58 of the insert 50.

In a preferred embodiment of the present invention, the thickness "t" does exceed 60% of the total width, represented by "w", of the composite leaf spring 10, 12. If the thickness "t" exceeds 60% of the total width "w", or if too much carbon fiber insert 50 is added to the longitudinal side regions 54 of the leaf spring 10, 12, the composite leaf spring 10, 12 may fail on the top surface 56 and the bottom surface 58 as the composite leaf spring 10, 12 is deformed vertically through its range of travel.

The addition of carbon fiber insert 50 at other places within the leaf spring 10, 12 has little or no effect on lateral stiffness. For example, carbon fiber insert 50 within the middle portion between the two longitudinal side regions 54 has little if any effect on improving lateral stiffness.

Other factors that may affect the amount of carbon fiber added to the longitudinal side region 54 include the size of the composite leaf spring 10, 12, the cost of the carbon fiber used in the composite 50, and the system in which composite leaf spring 10, 12 is placed.

Referring now to FIG. 4, a chart is depicted showing the effects of adding two 11 mm×10 mm inserts 50 into a 20 mm×75 mm fiberglass spring 10, 12 as shown in FIG. 2. The total volume of carbon inserts 50 are thus 14.66% of the total volume (220 $mm^2$/1500 $mm^2$×100%) of the spring 10, 12. As shown in the graph, approximately a 65% increase in lateral stiffness, from 2.26E+10 to 3.74E+10, is measured for the spring 10, 12.

To produce the composite leaf spring 10, 12, two preferred methods are currently contemplated. One method is to make the springs 10, 12 out of layers of preprag tape. The preprag tape consists of unidirectional fibers (glass and carbon) with uncured resin surrounding them. The layers can be stacked on top of each other until a desired thickness is achieved. The layers are then compacted and heated to cure the resin. In a preferred embodiment, an epoxy resin is used to cure the layers.

Another preferred method for making the springs is 3-dimensional (3D) weaving. In this method, multiple spools of fiber (glass and carbon) feed fiber into a weaving machine that loops the fiber across the width and through the thickness, with a majority of the fibers running in the machine direction along the length of the beam preform. These preforms are then placed in a mold and injected with resin using an RTM process. This method allows the springs 10, 12 to have integral pivots, as slits can be left in the preform allowing bushings or other inserts to be inserted in them. Again, as above, an epoxy resin is contemplated as the curing resin.

The composite leaf springs 10, 12 offer advantages over pure fiberglass leaf springs. First, the carbon fiber inserts 50 increase the lateral stiffness significantly compared to pure fiberglass leaf springs. As shown in FIG. 2, a pair of carbon fiber inserts comprising approximately 14.66% of the total volume of the spring increased lateral stiffness by approximately 65%. Increased stiffness may translate to improved handling feel for a user of a vehicle containing the improved springs 10, 12.

An additional benefit of improved lateral stiffness is recognized in the packaging of the suspension system and fuel tank (not shown) within a vehicle. The tolerances that are required between a fuel tank and the solid axle 26 should be sufficiently large to allow for lateral movement in the spring. By increasing the lateral stiffness in the spring 10, 12, the tolerances may be tightened, allowing larger fuel tanks or more efficient packaging of fuel tanks within a vehicle.

While the invention has been described in terms of preferred embodiments, it will be understood, of course, that the invention is not limited thereto since modifications may be made by those skilled in the art, particularly in light of the foregoing teachings.

What is claimed is:

1. A composite leaf spring comprising:

a plurality of composite strips coupled together by a coupler, each of said composite strips comprised of a fiberglass strip and a pair of carbon fiber strips, one of said pair of carbon fiber strips coupled within a first longitudinal side of said fiberglass strip and the other of said pair of carbon fiber strips coupled within a second longitudinal side of said fiberglass strip, wherein said first longitudinal side and said second longitudinal side are on opposite sides of said fiberglass strip;

wherein each of said pair of carbon fiber strips is comprised of carbon fiber and a curable resin and wherein said pair of carbon fiber strips comprises between 10 and 20% of the total volume of said composite strips.

2. The composite leaf spring of claim 1, wherein the volume of said pair of carbon fiber strips is a function of a lateral stiffness value of said composite strip.

3. The composite leaf spring of claim 2, wherein the volume of said pair of carbon fiber strips is also a function of a strain value of said composite strip.

4. The composite leaf spring of claim 1, wherein the volume within each of said pair of carbon fiber strips is equal.

5. The composite leaf spring of claim 1, wherein said fiberglass strip is comprised of E-type fiberglass and a curable resin.

6. The composite leaf spring of claim 1, wherein said curable resin is an epoxy-type resin capable of curing when said fiberglass strip and said pair of carbon fiber strips are molded into one of said plurality of composite strips.

7. The composite leaf spring of claim 1, wherein said composite leaf spring is contained within a suspension system of an automobile.

8. A method for improving lateral stiffness in a fiberglass composite leaf spring, the method comprising the steps of:

introducing a first quantity of carbon fiber composite to a first longitudinal side of the fiberglass composite leaf spring; and introducing a second quantity of carbon fiber composite to a second longitudinal side of the fiberglass composite leaf spring, wherein said first longitudinal side is opposite said second longitudinal side, wherein said first quantity and said second quantity of carbon fiber composite are each comprised of a plurality of carbon fibers and a quantity of a curable resin.

9. The method of claim 8, wherein said first quantity and said second quantity are equal.

10. The method of claim 8, wherein the steps of introducing a first quantity and introducing a second quantity comprise the steps of:

introducing between 5 and 10% by volume of a carbon fiber composite to a first longitudinal side of the fiberglass composite leaf spring; and introducing between 5 and 10% by volume of said carbon fiber composite to a second longitudinal side of the fiberglass composite leaf spring, wherein said first longitudinal side is opposite said second longitudinal side, wherein said first quantity and said second quantity are equal, wherein said carbon fiber composite is comprised of a plurality of carbon fibers and a quantity of a curable resin.

11. The method of claim 8, wherein said first quantity and said second quantity are a function of an allowable strain value for the fiberglass composite leaf spring.

12. A method for making a composite leaf spring for use in a suspension system, the composite leaf spring having a pair of carbon fiber longitudinal side regions contained within a fiberglass fiber region, the method comprising the steps of:

placing at least one first layer of preprag tape onto a form, each of said at least one first layer comprised of a first quantity of fiberglass fiber and an amount of uncured resin;

stacking at least one second layer of preprag tape onto said at least one first layer, each of said at least one second layer comprised of a second amount of said uncured resin and a second quantity of fiberglass fibers placed between a third quantity of carbon fibers and a fourth quantity of carbon fibers;

stacking at least one third layer of preprag tape onto said at least one second layer, each of said at least one third layer being similar in composition to each of said at least one first layer;

compacting and heating said at least one first layer, said at least one second layer, and said at least one third layer to form the composite leaf spring having a desired size and shape, wherein the step of heating cures said uncured resin.

13. The method of claim 12, wherein the total height of said at least one second layer cannot exceed 60% of the sum total height of said at least one first layer, said at least one second layer, and said at least one third layer.

14. The method of claim 12, wherein said uncured resin is comprised of an epoxy-based uncured resin.

15. The method of claim 12, wherein the total volume of the sum total of the volume of said third quantity and said fourth quantity comprises between 10 and 20% of the sum total of the total volume of said first quantity, said second quantity, said third quantity and said fourth quantity.

16. A method of making a composite leaf spring for use in a suspension system, the composite leaf spring having a pair of carbon fiber inserts with opposite sides of the longitudinal side regions of the fiberglass fiber composite, the method comprising the steps of:

weaving a first quantity of fiberglass fiber and a second quantity of carbon fiber into a preform;

placing said preform on a mold;

injecting a third quantity of resin into said mold;

molding said first quantity, said second quantity, and said third quantity into a desired size and shape to form the composite leaf spring.

17. The method of claim 16, wherein the step of weaving comprises the step of weaving between 80 and 90% by volume of fiberglass fiber with between 10 and 20% by volume carbon fiber into a preform.

18. The method of claim 16, wherein the step of injecting a third quantity of resin into said mold comprises the step of injecting a third quantity of epoxy-based resin into a mold.

* * * * *